United States Patent [19]

Doucet et al.

[11] Patent Number: 4,675,512
[45] Date of Patent: Jun. 23, 1987

[54] ELECTRICALLY HEAT-RECOVERABLE ARTICLE

[75] Inventors: Jozef G. A. Doucet, Kessel-lo; Amandus L. E. Pieck, Kortenaken; Francis J. A. M. C. De Blauwe, Lubbeek, all of Belgium

[73] Assignee: NV Raychem SA, Kessel-lo, Belgium

[21] Appl. No.: 584,045

[22] Filed: Feb. 27, 1984

[30] Foreign Application Priority Data

Mar. 1, 1983 [GB] United Kingdom ............... 8305639

[51] Int. Cl.⁴ ............................................. H05B 3/06
[52] U.S. Cl. .................................. 219/535; 219/541; 219/505; 174/92
[58] Field of Search .............. 219/385, 535, 541, 544, 219/553; 174/72, 73, DIG. 8; 264/230, 242; 428/36, 157, 375; 213/1

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,597,372 | 8/1971 | Cook | 260/4 |
| 3,717,746 | 2/1973 | Breitweiser | 219/535 X |
| 4,085,286 | 4/1978 | Horsma et al. | 172/92 |
| 4,177,376 | 12/1979 | Horsma et al. | 219/553 |
| 4,177,446 | 12/1979 | Diaz | 348/212 |
| 4,366,201 | 12/1982 | Changani et al. | 174/DIG. 8 X |
| 4,420,654 | 12/1983 | Müller | 174/92 |

FOREIGN PATENT DOCUMENTS

| | | |
|---|---|---|
| 0008912 | 3/1980 | European Pat. Off. . |
| 0038659 | 10/1981 | European Pat. Off. . |
| 0045213 | 2/1982 | European Pat. Off. . |
| 0052476 | 5/1982 | European Pat. Off. . |
| 2340965 | 2/1975 | Fed. Rep. of Germany ...... 219/535 |
| 2335022 | 12/1975 | France . |
| 2451650 | 3/1980 | France . |
| 1440524 | 6/1976 | United Kingdom . |

*Primary Examiner*—E. A. Goldberg
*Assistant Examiner*—M. M. Lateef
*Attorney, Agent, or Firm*—T. Gene Dillahunty; Herbert G. Burkard

[57] ABSTRACT

A wrap-around heat-recoverable sleeve (1) suitable for providing environmental protection around pipes or cables (24) has self-contained electrical heating means powered through closure members (2,3) of the sleeve.

14 Claims, 15 Drawing Figures

ELECTRICALLY HEAT-RECOVERABLE ARTICLE

FIELD OF THE INVENTION

The present invention relates to a wrap-around article that can be caused to recover by electrical heating.

BACKGROUND OF THE INVENTION

Recoverable articles have found wide use for environmental sealing because of the ease with which they can be installed, the strength of seal that can be obtained, and the wide range of size of substrates with which any one design can be used. Recovery can be initiated by various means, although heat-recovery is at present preferred since heat-recoverable products are simple to produce and do not require specialized equipment to install. The article is simply placed over the substrate to be protected and heated which causes it to recover, generally by shrinking, into close conformity with the substrate.

A heat-recoverable article (an article the dimensional configuration of which may be made substantially to change when subjected to heat treatment) usually will recover towards an original shape from which it has previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962 the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recovery.

There are instances where the substrate to be environmentally sealed has no accessable end (for example a cable or pipe which cannot conveniently be severed) or where the substrate is situated in a confined space (such as a man-hole). In such cases a tubular article cannot be slid over an end of the substrate, and to overcome the problem wrap-around sleeves have been developed. A wrap-around sleeve is simply a sleeve which can be installed around a substrate with no free end and then secured in the wrapped-around configuration. The sleeve may be provided with closure members adjacent apposing edges, which interlock or which are held together by a further member.

The commonest method of heating such sleeves to cause recovery is by means of a propane torch or a hot-air gun. A propane torch has the advantage of being portable and of providing the correct temperature for the larger sleeves most commonly used, although uniform heat application in confined spaces is difficult, and its use is prohibited where flammable materials are present. Hot-air guns are rarely a good substitute since they are unable to deliver sufficent heat at the right temperature.

In order to avoid the disadvantages of the use of a flame, electrical heating systems have been developed. As well as the basic advantage of no flame, an electrical system can be compact, if operated at low voltages can totally avoid any danger of sparking, and can incorporate self-regulation making installation very simple.

Systems for electrical heating of recoverable sleeves can be classified as two general types: firstly, an electrical heater can be secured in thermal contact with a recoverable sleeve, and secondly the material of the sleeve may itself constitute part of the electrical circuit. In the first of these types electrical heating wires or sheet may be bonded to or embedded in the sleeve so that the sleeve becomes hot simply through conduction.

This idea is disclosed in published European Patent Application No. 38659 to UBE Industries Ltd. A heat-shrinkable cover sheet has branched tongue-like portions at its end, which can slot and bond together. The ends of the sheet and the central part are separately provided with electrical heating wires arranged in a zig-zag pattern. The wires simply terminate at the edge of the sheet for connection to a power source.

The second type mentioned above employs a special recoverable sleeve which itself has the ability to become hot when subjected to electrical power. The requirement here is for a material which is electrically resistive, is capable of being made heat-recoverable, and is flexible. Conductive polymers, such as those made by loading polyolefins with carbon black, have these characteristics and can be made self-regulating by proper choice of the carbon content. Self-regulation results from the material having a positive temperature coefficient of resistance (PTC) so that when the material reaches a certain temperature its electrical resistance rises, thus sharply cutting off power input and preventing further heating. This feature is of great benefit since it allows simple power supplies without thermostats or other controls to be used and it makes installation of the sleeve less craft-sensitive. The heating characteristics may be improved by combining a layer of PTC material with a layer of constant wattage (CW) material in such a way that current flows through both: this can lead to reduced current in-rush on initial connection of the power, and to a greater heating capacity. For a fuller discussion on electrically heatable polymers the reader is directed to U.S. Pat. No. 4,177,376, which although concerned mainly with heaters describes the electrical properties of the class of polymers commonly used to make recoverable sleeves.

A commercially available article embodying heat-recovery and conductive polymer self-heating is a tape marketed under the Raychem trade mark Autowrap. This tape is about 10 cm wide and has an electrical conductor running adjacent each longitudinal edge. It is wrapped spirally around a substrate to be covered, and when powered through the two conductors it shrinks longitudinally thereby tightening onto the substrate. A certain degree of care is required when wrapping this tape around the substrate since sufficient overlap between adjacent turns must be provided to prevent leak paths remaining. Careful wrapping can be difficult in some circumstances when the substrate has a significant variation in cross-sectional size along its length.

DESCRIPTION OF THE INVENTION

We have now designed a simple sealing system which combines the advantages of electrical heating with those of wrap-around sleeves.

Thus, the present invention provides a wraparound heat-recoverable sleeve having electrical heating means, and closure members which can be secured together to maintain the sleeve in a wraparound configuration and through which the heating means can be powered.

The closure members preferably provide means whereby incoming power is distributed to a sheet electrode lying in or on the material of the sleeve. More preferably, the closure members provide conductors running substantially the length of the sleeve in a flat configuration.

The use of such widely and uniformly distributed power for shrinking a sleeve in a flat configuration has been found to be able to provide an unexpected advantage. We have found that it is possible to achieve quick heating and therefore quick recovery since much energy can safely be employed at low current densities, and that this can still result in a rather quicker recovery at the centre of the sleeve than at its ends. This is of advantage since air is progressively driven out from between the substrate and the sleeve as the sleeve recovers. Furthermore any adhesive coating on the surface of the sleeve is squeezed or rolled onto the substrate as recovery progresses from the centre of the sleeve outwards. The reason for this progressive recovery is not fully understood.

This effect can be enhanced or overcome or other form of programmed recovery can be brought about by suitable design of the heating means and closure members. For example, the resistivity of any conductors comprising the closure members, or of any heater material or electrode can be varied along the length of the sleeve, to cause a non-uniform rate of heating at different parts of the sleeve. Instead of a variation in resistivity, localised insulation can be provided.

The closure members referred to may be first and second closure members positioned respectively adjacent opposing edge portions of the sleeve. These closure members (through which the power is supplied) may interlock, or be held towards one another by a third member which does not participate in the electrical circuit.

An alterative arrangement is where first and second closure members at adjacent opposing edge portions of the sleeve are held by a third member, power being supplied by applying a potential difference between the third member and either of the first and second members. This can be varied slightly by additionally connecting the other of the first and second members to either side of the power supply.

Current may be arranged to flow in the plane of a conductive recoverable sleeve either circumferentially axially of the sleeve, or perpendicular to that plane namely though the thickness of the material of the sleeve. Where the sleeve is simply heated by conduction from a separate electrical circuit the current path will generally be in the plane of the sleeve.

The tendency for heat to be produced in a very thin central band when a conductive polymer sheet is powered by widely spaced strip or wire electrodes, makes preferable the use of electrodes substantially co-extensive with the sheet and arranged to cause current to flow through the thickness of the sheet. This problem of hot-lining, which is more noticeable with large sleeves, high heat capacities or high recovery temperatures, can be at least partially overcome by the heater designs described in U.S. Pat. No. 4,177,376 mentioned above.

The preferred direction of current flow through the thickness of the sheet will be produced in a laminate comprising a recoverable conductive polymeric material between two sheet electrodes. An insulating layer may be provided on the exposed surface of each electrode. It is necessary that the electrodes be in good electrical contact with the conductive polymeric sheet over that period when heating is required and this will generally require continued physical contact during at least some of the recovery cycle. Some means should be provided whereby the electrode can change its size or shape to follow the change in the recovering sheet. A preferred method is to produce an electrode having the size and shape required after recovery, to produce an array of slits in the electrode, and then to expand the electrode to correspond to the pre-recovery size of the sleeve. An alternative technique is to form each electrode as a highly perforate metal sheet, especially with diamond-shaped holes, which can easily distort on recovery. Contact between the closure members and the electrodes can be made by localised removal of any insulating layer at the regions of the sheet where the closure members are to be provided. The various components of the laminate may be bonded together with an adhesive, for example a pressure-sensitive adhesive or a hot-melt adhesive. Where a hot-melt or similar adhesive is used, the temperature at which the adhesive begins to fail should of course be chosen depending on the recovery temperature of the sheet.

Where the current is to run substantially parallel to the recoverable sheet, whether or not the sheet is part of the circuit, the electrodes may be in wire or strip form. The electrodes may be part of the closure members or constitute the whole of the closure members, and they may be attached to a surface of the sheet or embedded in the sheet. Where the electrodes are on the surface of a conductive polymeric sheet, they may be positioned on opposite surfaces and spaced apart thus producing a diagonal current path.

If the sheet is part of the circuit, the electrodes may be positioned spaced apart a suitable distance to apply voltage to the sheet. It is preferred that the closure members constitute the electrodes, and in such a case the current path will be circumferential through the whole width of the sleeve. Some insulation will generally be required between the opposing edge portions of the sheet which are brought together on installation in order to prevent a short from one closure member to another.

Where the sheet is not part of the heating circuit, some form of discrete heater must be applied. Such a discrete heater may be a metal resistance wire, metal resistance sheet or may be a conductive polymer heater.

In each of these cases it will be desirable to ensure that the heater can alter its size or shape to follow the change in the recovering sheet. This requirement was mentioned above in connection with the sheet electrode for a recoverable conductive polymeric material. In the case of a sheet heater, the solution given above for the sheet electrode is preferred. Where the heater is a wire it can simply be arranged to follow a path such as a ziz-zag that can collapse as the sleeve recovers, and where the heater is a polymeric material it can be made recoverable to a similar exent to the recoverable sleeve to be installed.

The heater used preferably embodies some sort of control or regulation, although this could be provided as part of the power supply rather than part of the sleeve. It has been found desirable to provide the sleeve with its own means of control since this allows simple, widely available power supplies to be used, and ensures that the control is always correctly matched to the heater and sleeve. The self-regulation possible with conductive polymers mentioned above is preferably a feature of the sleeves of the present invention. Recovery of the sleeve becomes extremely simple since all that has to be done is to connect to a power supply (which may merely be a battery) and wait until recovery can be seen to be complete, or until any heat-activatable sealing material used in conjunction with the sleeve has reached its desired temperature.

In a preferred embodiment of the invention, the heater itself, or electrodes which supply power to a recoverable polymeric sleeve, are in sheet form; and the closure members distribute power from a cable from the power supply to these sheets. The closure members run lengthwise of the sleeve and make electrical contact with the heater or electrodes along substantially the entire length of the sleeve. In such a system where the sleeve is a laminate of electrodes and recoverable conductive polymeric material a preferred way of making the closure members is to wrap each longitudinal edge portion of the recoverable material around a rod or other elongate conductor. Both edge portions are wrapped the same way (say clockwise) around the conductors so that one conductor contacts an electrode on one surface of the recoverable material and the other conductor contact an electrode on the other surface. The two resulting closure members may be held together to maintain the sleeve is a wrap-around configuration by a third member which does not form part of the electrical circuit. It can be seen that the application of a potential difference between the two closure members will result in passage of current through the thickness of the recoverable sleeve.

BRIEF DESCRIPTION OF THE DRAWINGS

The invention is further illustrated with reference to the accompanying drawings, in which:

FIG. 1 shows a prior art wrap-around sleeve 1 which is heated by means of a propane torch to cause recovery. The sleeve 1 has closure members 2,3 at opposing longitudinal edge portions which can be held together by means of a further closure element 4. The sleeve 1 is shown positioned around a substrate 5 which is to be environmentally sealed.

Figure 1:
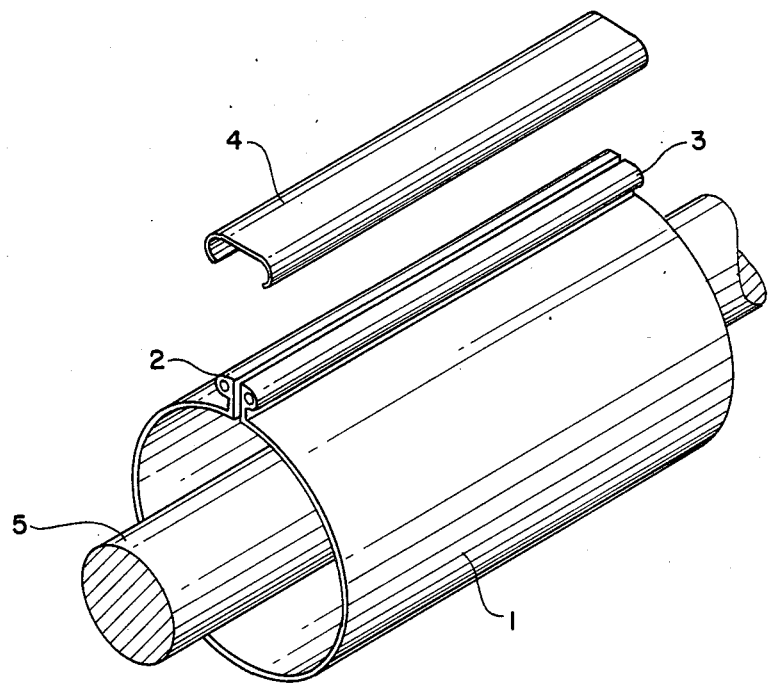
FIG. 1 shows a prior art heat recoverable sleeve having no electrical heating system.
Figure 2:
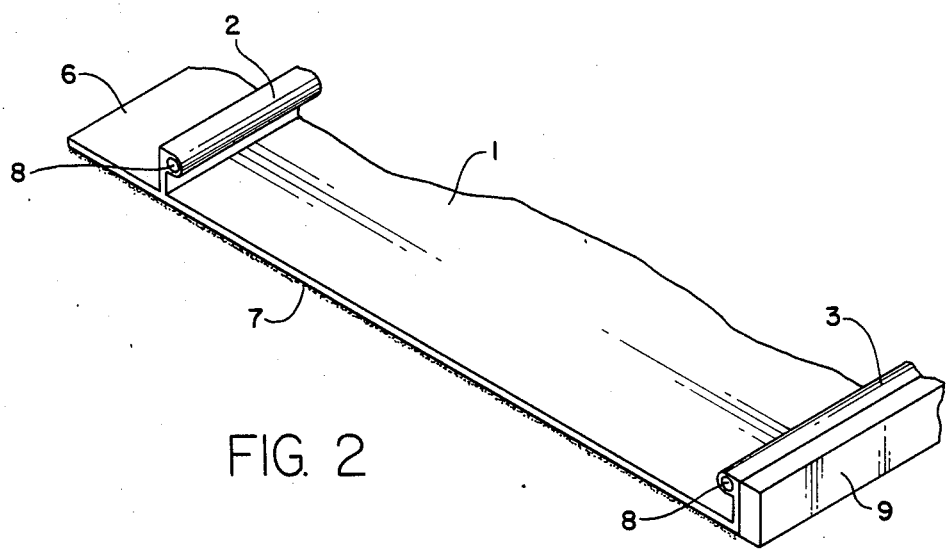
FIG. 2 shows an electrically heatable sleeve on a flat configuration.

An embodiment of the invention where current is made to flow in the plane of the sleeve is show in FIG. 2. The sleeve 1 is formed of a heat-recoverable conductive polymeric material. The sleeve has closure members 2,3 and also has a flap 6 which underlies the closure members 2,3 and seals between them when the sleeve is in the wrap-around configuration. An adhesive coating 7 is also shown. Embedded in each closure member 2,3 is a conductor 8 and insulation 9 is provided to prevent shorting diretly between the closure members. When a potential difference is applied to the two conductors 8 a current flows in the plane of the sleeve 1 causing it to become hot and recover.

Figure 3A:
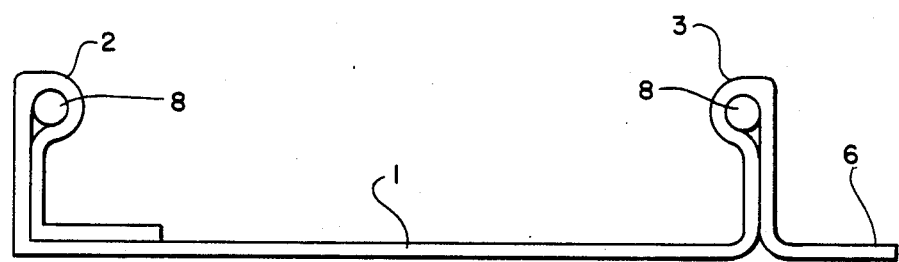
FIGS. 3a–b shows an alternative electrically heatable sleeve in a flat configuration.
Figure 3B:
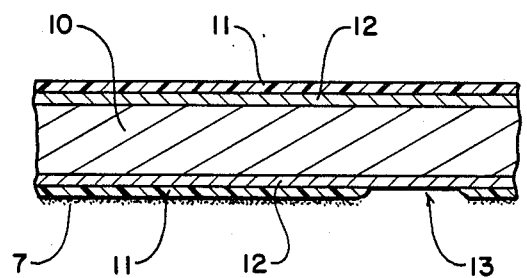

FIG. 3 shows a preferred embodiment where current is caused to flow through the thickness of the material of the sleeve 1. As before, closure members 2,3 contain conductors 8. The closure members are formed by wrapping edge portions of the sleeve around the conductors; both edge portions being wrapped the same way, clockwise as drawn. As a result the conductor 8 at the left-hand side of the sleeve as drawn contacts the upper surface of the sleeve, and the right-hand conductor 8 contacts the lower surface. The inset of FIG. 3 shows how this wrapping around the conductors 8 causes the power to be provided to the conductive polymeric material of the sleeve. In FIG. 3b sleeve 1 is a laminate including a central conductive polymer 10, insulations 11, sheet electrodes 12, and adhesive coating 7. The insulation 11 (and where appropriate the adhesive 7) has been removed at a region 13 where the sleeve is to be wrapped around the conductors 8 in order that electrical contact with sheet electrodes 12 be made.

Variations on the arrangement of FIG. 3 are shown in FIGS. 4a–4e. In each of these variations current is caused to flow through the thickness of the material the sleeve; however, a third closure member, which holds the first two together, is now part of the electrical circuit.

Figure 4A:
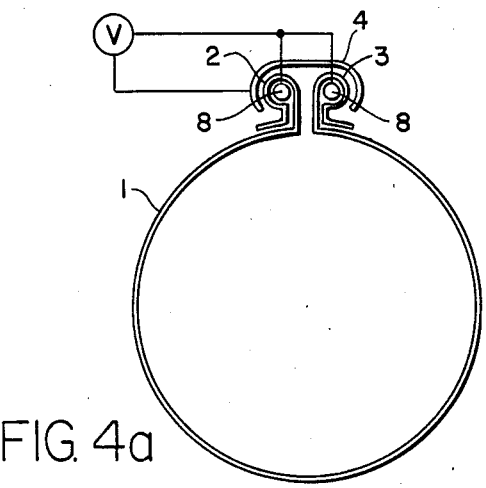
FIGS. 4a–4f show variations on the sleeve of FIG. 3.

In FIG. 4a a potential difference is applied between conductors 8 in the closure members 2,3 on the one hand, and element 4 on the other hand. Both conductors 8 contact the outer surface of the sleeve (considered over the web portion rather than the closure portion) and the closure element 4 contacts the inner surface of the sleeve.

Figure 4B:
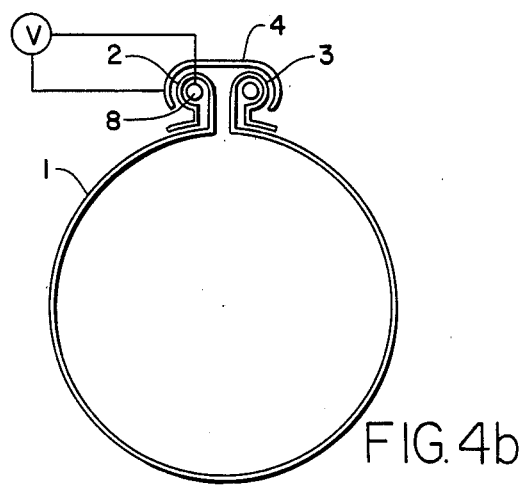

FIG. 4b is similar to FIG. 4a except that only one of the closure members 2,3 is involved.

Figure 4C:
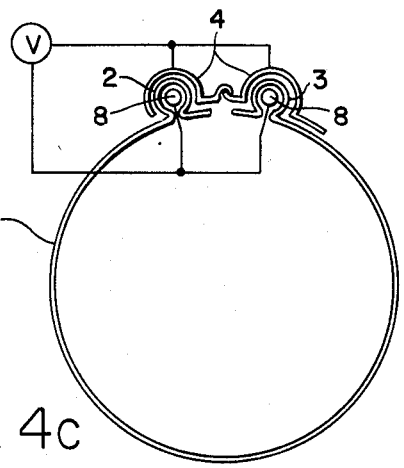

A two-part closure element 4 shown in FIG. 4c. The potential difference is applied between closure element 4, and both of closure member 2 and 3. The two-part nature of closure element 4 allows the opposing edge portions of the sleeve to be secured by snapping or latching together. It is preferred that each conductor 8 and corresponding half of the closure element 4 be fixed together or be fixed to the edge portion of the sleeve. In this way each edge portion of the sleeve may be supplied with a preformed closure, the two closures then being snapped or latched together in the field.

Figure 4D:
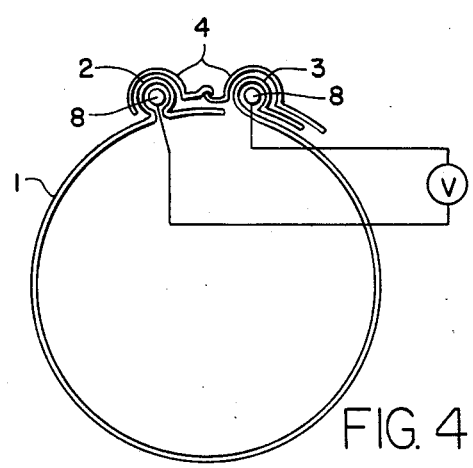

A similar two part closure member 4 is shown in FIG. 4d, but here it does not form part of the electrical circuit. A potential difference is applied between the two conductors 8 which contact electrodes on opposite surfaces of the conductive polymer component of the sleeve. This is achieved by the technique illustrated in FIG. 3 namely the particular direction of wrapping of the edge portions of the sleeve around the conductors.

Figure 4E:
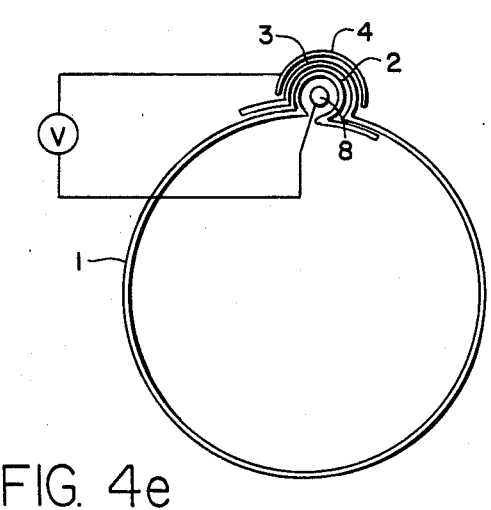

An omega-shaped closure is shown in FIG. 4e. One edge portion of the sleeve has an omega shaped protruberance 2 on an external surface, and the opposing edge portion has an omega-shaped recess 3 on its internal surface. The protruberance 2 can be snapped within the recess 3, and the engagement made more secure, if need be, with a further closure element 4. The recess 3 and protruberance 2 may be fashioned by bending the material as shown around a conductor 8, or by preforming before use. An alternative is to provide a solid protruberance having the conductor 8 embedded therein. Analogously, the recess 3 may be formed in a thickened edge portion of the sleeve. The potential difference is applied between the closure element 4 (which contacts the external surface of the sleeve) and the conductor 8 (which contacts the internal surface of the sleeve).

Figure 4F:
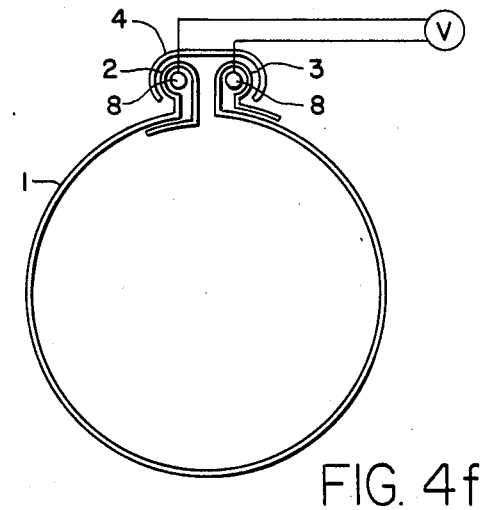

In FIG. 4f the two electrodes contact opposite surfaces and the sleeve due to the directions of wrapping the edges of the sleeve. The two edges are formed into rails which are held together by a channel.

In each of these embodiments the sleeve as produced or as supplied for use is preferably covered on each side with a layer of insulation as illustrated in the FIG. 3b. A strip of insulation should be removed at that place where each conductor 8 or the closure element 4 (as appropriate) is to make electrical contact with the underlying sheet electrode which constitutes part of the laminate sleeve. Provision can be made on the sleeve, for example by lines of weakness, for removal of a strip of insulation across the surface of the sleeve chosen according to the desired position of the closure members and hence the pre-recovery size of the assembled sleeve. If a suitable closure arrangement is chosen the sleeve can be cut to length and closure members can be formed in the field. This technique also allows closure members to be arranged at an angle to one another in order to make a conical rather than cylindrical sleeve. Such a sleeve allows substrates to be covered having a transition in cross-sectional size greater than the recovery ratio of the sleeve.

Figure 5:
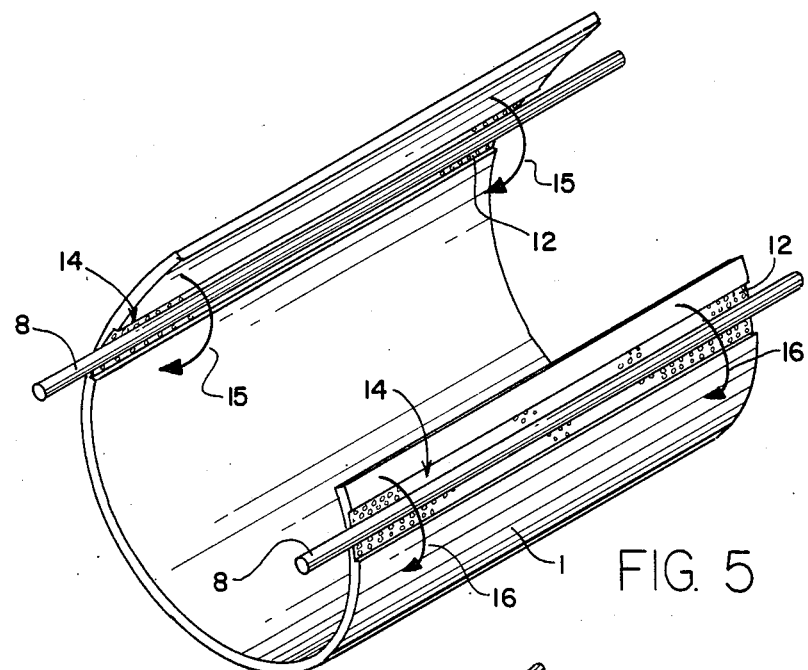
FIG. 5 shows formation of electrically powerable closure members.
Figure 6:
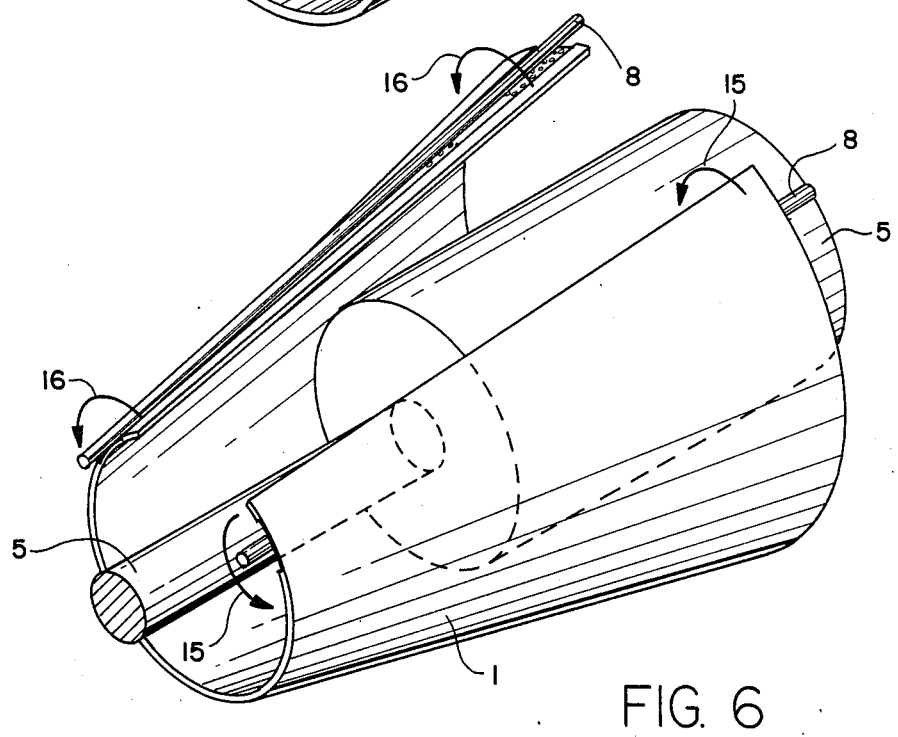
FIG. 6 shows encapsulation of a substrate having a large variation in size along its length.

This formation of the closure members is illustrated in FIGS. 5 and 6. FIG. 5 shows production of a cylindrical sleeve by removal of strips of insulation 14, one from each side of the sleeve, to expose perforate sheet electrodes 12. The edge portions of the sheet is then wrapped around conductors 8 in the directions of the arrows 15 and 16. In FIG. 6 a conical sleeve is formed by removing converging strips of insulation. One design of laminate sheet can therefore be used to produce recoverable sleeves of differing sizes and shapes. The shape chosen will depend on the shape of the substrate to be covered in the sense that positioning of the recoverable sleeve is to be facilitated; the sleeve will not generally be produced to match precisely the shape to be covered since this precise matching is achieved by recovery of the sleeve. For example a sleeve designed to cover a termination of a cable to a cylindrical substrate five times the diameter of the cable need not be shaped with a 5X step×shaped transition along its length. A suitable product for sealing this termination would be a sleeve having a 3X recovery ratio and having non-parallel closure members arranged to produce a frusto-conical shape whose small end was half the size of its large end. This is illustrated in FIG. 6 where the overall shape of the sleeve has been trimmed to match the position of the closure members, although on the sleeve could remain rectangular (when unwrapped) by providing a greater overlap at the smaller end. In all embodiments of the invention, the change in shape that the sleeve must follow as it recovers to seal the substrate will determine the flexibility that the closure members must posses. In general a conductor 8 of wire (single or multistranded) will present no problems. For particularly steep transitions the conductors 8 or the closure members in total may be discontinuous along the length of the sleeve, or be provided with regions of increased flexibility or hinging.

Figure 7:
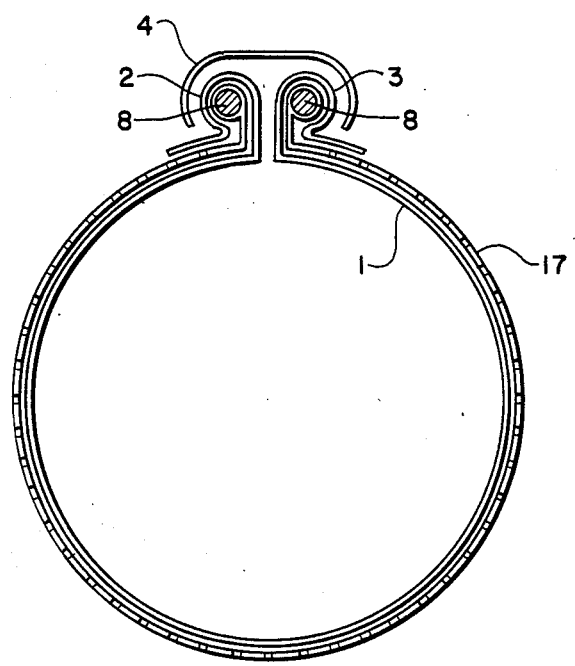
FIG. 7 shows a sleeve with a separate heater.

FIG. 7 shows an embodiment of the invention where a separate heater 17 is used in thermal contact with the sleeve 1. The heater, which is electrically connected to the conductors 8, is formed of a perforate sheet of suitable electrical resistance. The sheet if sufficiently perforated will be able to collapse as the sleeve shrinks. It is necessary that sufficient thermal contact with the sleeve be maintained to allow complete recovery, but in general some break-away can occur towards the later stages of recovery.

Figure 8:
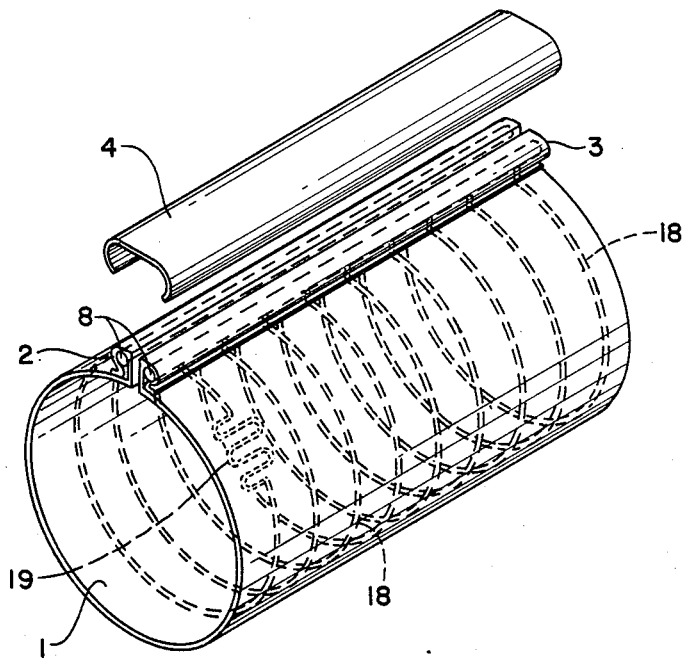
FIG. 8 shows a sleeve with electrical heating wire.

FIG. 8 also illustrates use of a separate heater. Here the heater comprises a series of resistance wires 18 arranged in parallel between the two conductors 8 of the closure members 2 and 3. Other patterns of heating wire may be used, for example a single length of wire connected at one end to one conductor 8, and at the other end to the other conductor 8. In either case it may be preferable that the wire follow a ziz-zag pattern progressing in the direction of recovery since this facilitates collapse of the heater as recovery proceeds. This is shown as 19 in FIG. 8.

Figure 9:
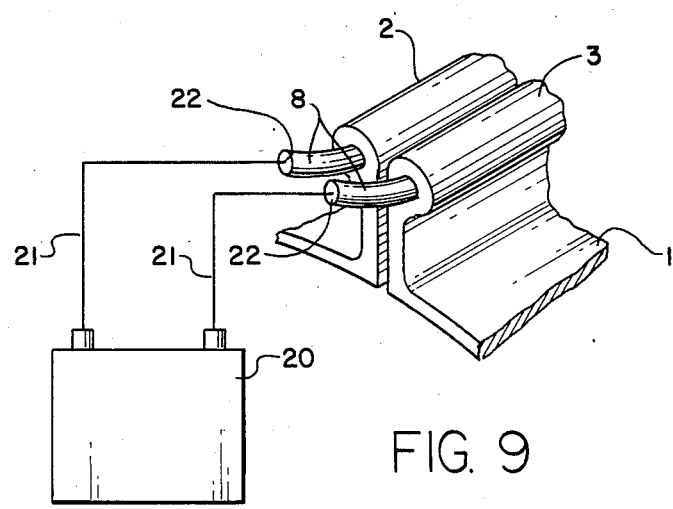
FIG. 9 shows a sleeve showing connection to a power supply.

FIG. 9 shows connection of a sleeve of the invention to a power supply 20 via cables 21. The ends of the conductors 8, or other part of the closure members, may be provided with a terminal 22 or other means for electrical connection.

Figure 10:
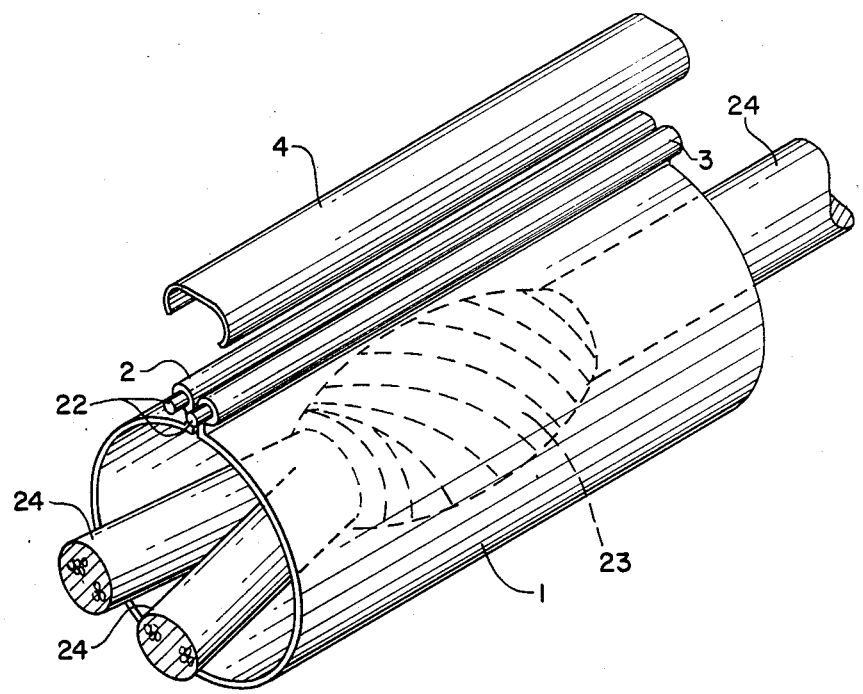
FIG. 10 shows a telecommunications splice with an electrically heatable sleeve.

FIG. 10 shows one use of a sleeve of the invention. A splice 23 between three telecommunications cables 24 is to be environmentaly sealed by sleeve 1. The sleeve is wrapped around the splice, secured in the wraparound configuration by a closure member 4 and some means such as a clip or flexible seal (a flexible envelope containing a void-filling composition) is provided to seal the region of the branch-off. The sleeve is then connected to a source of electrical power to cause it to recover into sealing engagement with the cables at either side of the splice. Recovery is not essential in the intermediate region provided a seal between the closure members 2 and 3 can be ensured. Closure element 4 can be used to hold closure members 2 and 3 together. A liner can be provided between the splice and the sleeve for further protection.

We claim:

1. A wraparound heat-recoverable sleeve comprising a conductive polymeric material which self-heats when subjected to electrical power and closure members which can be mechanically secured together to maintain the sleeve in a wraparound configuration and which contain an elongate conductor through which the conductive polymeric material can be powered.

2. A wraparound heat-recoverable sleeve comprising a discrete electrical heater and closure members which can be mechanically secured together to maintain the sleeve in a wraparound configuration and which contain a conductor through which the heater can be powered.

3. A sleeve according to claim 2, in which the discrete heater comprises a metal sheet fixed to the sleeve.

4. A sleeve according to claim 2, in which the discrete heater comprises a resistance wire or wires fixed to the sleeve.

5. A sleeve according to claim 1, in which the closure members comprise first and second elongate conductors in electrical contact respectively with opposing longitudinal edge portions of the sleeve so that a potential difference applied between the conductors causes current to flow substantially in the plane of the material of the sleeve.

6. A sleeve according to claim 5, in which the first and second conductors are embedded in the opposing edge portions.

7. A sleeve according to claim 5, in which the opposing edge portions are wrapped respectively around the first and second conductors.

8. A sleeve according to claim 1, in which the sleeve comprises a laminate of a conductive polymeric material between first and second electrodes such that a potential difference applied between the first and second electrodes causes current to flow substantially perpendicular to the plane of the material of the sleeve.

9. A sleeve according to claim 8, in which the closure members comprise a first elongate conductor adjacent a first edge portion of the sleeve and a second elongate conductor adjacent an opposing second edge portion, the first conductor being in electrical contact with the first electrode and the second conductor being in electrical contact with the second electrode.

10. A sleeve according to claim 9, in which the first and second closure members are held together by a closure element which does not form part of the electrical heating circuit.

11. A sleeve according to claim 9, in which the first conductor is fixed relative to the first edge portion, and the first and second edge portions are held together by the second conductor.

12. A sleeve according to claim 8, in which the first and second electrodes are in sheet form and a layer of electrical insulation substantially covers the outwardly facing surface of each of the first and second sheet electrodes except at a region where electrical contact with respectively first and second conductors occurs.

13. A sleeve according to any of claim 8, in which the first and second electrodes are in sheet form and opposing edge portions of the sleeve are wrapped around elongate conductors, such that the first sheet electrode electrically contacts a first conductor and the second sheet electrode electrically contacts a second conductor; the edge portions and electrodes constituting the closure members.

14. A sleeve according to claim 1, having a coating of a heat-activatable adhesive on a surface that is inwardly facing when the sleeve is in a wraparound configuration.

* * * * *